United States Patent
Gries et al.

(10) Patent No.: US 6,850,284 B2
(45) Date of Patent: Feb. 1, 2005

(54) METHOD AND APPARATUS FOR DECODING AUDIO AND VIDEO INFORMATION

(75) Inventors: Patrick J. Gries, Crystal Lake, IL (US); James W. Stroming, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 40 days.

(21) Appl. No.: 10/228,567

(22) Filed: Aug. 27, 2002

(65) Prior Publication Data

US 2004/0041946 A1 Mar. 4, 2004

(51) Int. Cl.$^7$ .............................................. H04N 9/475
(52) U.S. Cl. ..................................... 348/512; 348/515
(58) Field of Search ............................ 348/512, 515, 348/552; 375/240.28

(56) References Cited

U.S. PATENT DOCUMENTS

| | | | |
|---|---|---|---|
| 4,313,135 A | | 1/1982 | Cooper |
| 5,396,497 A | | 3/1995 | Veltman |
| 5,430,485 A | * | 7/1995 | Lankford et al. ........ 348/423.1 |
| 5,537,148 A | | 7/1996 | Fujinami |
| 5,598,352 A | | 1/1997 | Rosenau et al. |
| 5,815,634 A | | 9/1998 | Daum et al. |
| 5,959,684 A | * | 9/1999 | Tan et al. ................... 348/515 |
| 6,061,399 A | * | 5/2000 | Lyons et al. ................. 375/240 |
| 6,148,135 A | * | 11/2000 | Suzuki ......................... 386/12 |
| 6,308,280 B1 | * | 10/2001 | Joseph et al. ............... 713/400 |
| 6,449,653 B2 | * | 9/2002 | Klemets et al. ............. 709/231 |
| 6,510,279 B1 | * | 1/2003 | Morishita ..................... 386/96 |
| 6,516,005 B1 | * | 2/2003 | Murayama et al. ......... 370/503 |
| 6,583,821 B1 | * | 6/2003 | Durand ....................... 348/515 |
| 2003/0016876 A1 | * | 1/2003 | Chai et al. .................. 382/240 |
| 2003/0043924 A1 | * | 3/2003 | Haddad et al. ........ 375/240.28 |

* cited by examiner

*Primary Examiner*—Victor R. Kostak
(74) *Attorney, Agent, or Firm*—Vedder Price Kaufman & Kammholz, P.C.

(57) ABSTRACT

To ensure synchronization of audio and video decoding operations, the decoding of encoded video information is slaved to the decoding of encoded audio information using the frame-based timing structure of encoded audio information. In one embodiment, time stamps are associated with the encoded audio and video information, which time stamps are encoded in the respective audio and video information relative to a common time reference. At the decode side, the encoded video information is decoded only when an audio time stamp compares favorably with an audio time stamp, e.g., the video time stamp is not greater than the audio time stamp. Otherwise, the encoded video information is not decoded until such time that its video time stamp compares favorably with a subsequent audio time stamp. Using the techniques of the present invention, audio/video synchronization is achieved without the need for a decode-side system timer or delay circuitry.

20 Claims, 4 Drawing Sheets

METHOD AND APPARATUS FOR DECODING AUDIO AND VIDEO INFORMATION

TECHNICAL FIELD

The present invention relates generally to wireless communication systems and, in particular, to a technique for decoding audio and video information.

BACKGROUND OF THE INVENTION

Wireless communication systems are well known in the art. In such systems, communications (particularly voice communications) are typically supported by a wireless infrastructure that supports wireless communications with and between one or more wireless communication devices (or mobile devices), such as cellular phones, portable two-way radios, wirelessly-enabled personal digital assistants, etc. Increasingly, suppliers of such mobile devices are working toward the provision of more than just voice communications. For example, it is desirable to provide video information as well and, in particular, so-called multimedia information including coordinated audio and video.

In general, audio/video multimedia content comprises audio information and video information streams that are independently encoded and multiplexed onto a single composite data stream. At a decoding device, the composite data stream is de-multiplexed and the resulting encoded audio and video streams are separately decoded. The respective audio and video decoding processes must be synchronized such that one process does not get too far ahead (in a temporal sense) of the other. Otherwise, the resulting presentation of decoded audio and video information may be objectionable where, for example, the decoded audio information of a speaker does not match the movement of the speaker's lips depicted in the decoded video information. This lack of synchronization is a significant problem, particularly in light of the fact that current audio and video encoding techniques typically do not provide encoded output at the same rate, i.e., they have different frame rates. This is further exacerbated by video encoders that do not operate at a strict frame rate and, instead, operate in a quasi-periodic fashion.

One class of technique addresses this synchronization problem by synchronizing the audio and video decoding processes to a high-resolution system timer reference. While these techniques work, they are not particularly attractive for use in mobile devices in which power consumption is always a concern. That is, the need to implement a system timer that is always available necessarily leads to decreased battery life in mobile devices.

In an alternative technique, the delay incurred by video decoding is continuously determined, which delay is thereafter used to adjust a variable delay to be induced in the audio decoding process. In essence, the decoding of audio information is slaved to the decoding of the video information by purposefully delaying audio decoding to match video decoding. However, this technique requires the provision of relatively sophisticated circuitry or processing to first determine the delay resulting from the video decoding process and to thereafter apply the delay in a variable fashion to the audio decoding process. Again, such circuitry or processing would prohibitively consume power resources in mobile devices.

Therefore, a need exists for a technique that facilitates synchronization of decoded audio and video information, particularly in mobile devices where minimized power consumption is essential.

DETAILED DESCRIPTION OF THE PREFERRED EMBODIMENTS

The present invention provides a technique for synchronizing decoding operations of encoded audio and video information. In particular, the present invention takes advantage of the structured timing inherent in many audio encoding processes to eliminate the need for a decode-side system timing reference. The decoding of encoded video information is slaved (or synchronized) to the decoding of encoded audio information using the frame-based timing structure of encoded audio information. In one embodiment of the present invention, audio time stamps are associated with the encoded audio information and video time stamps are associated with the encoded video information. The audio and video time stamps are encoded in the respective audio and video information relative to a common time reference. At the decode side, the video time stamp is compared to the audio time stamp. The encoded video information is decoded only when the audio time stamp compares favorably with the audio time stamp, e.g., the video time stamp is not greater than the audio time stamp. Otherwise, the encoded video information is not decoded until such time that its video time stamp compares favorably with a subsequent audio time stamp. In one embodiment of the present invention, a video decoder context is maintained separately from an audio decoder context. Audio and video decoding is performed using a primary storage. As encoded audio information is received, the video decoder context is swapped out of primary storage into secondary storage and the audio decoder context is swapped out of secondary storage into primary storage. Upon completion of the audio decoding processing, the updated audio decoder context and the video decoder context are once again swapped such that the video decoding process may continue. In this manner, the amount of primary storage required may be minimized. Using the techniques of the present invention, audio/video synchronization is achieved without the need for a decode-side system timer or delay circuitry.

Figure 1:
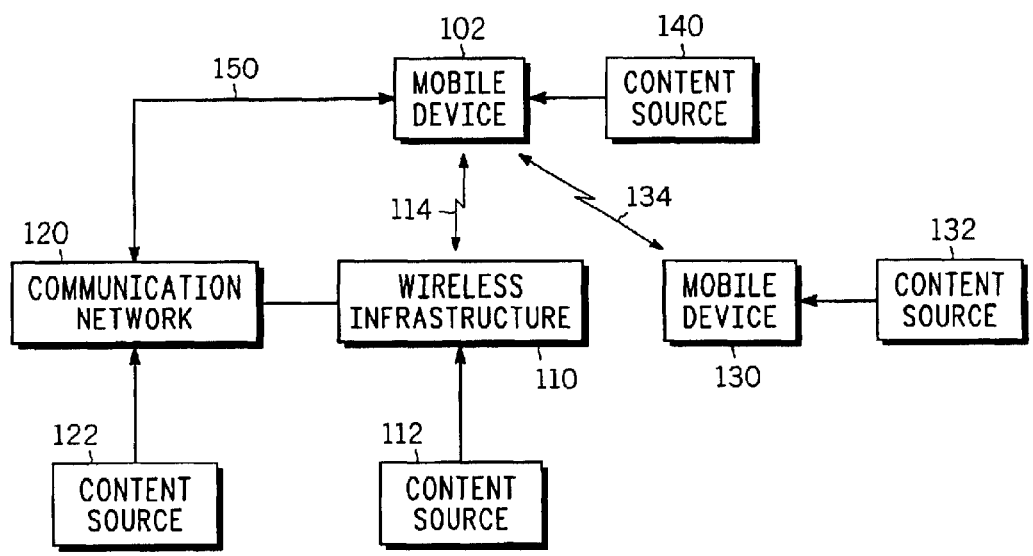
FIG. 1 is a block diagram of a wireless communication system in accordance with an embodiment of the present invention.

These and other advantages of the present invention are more fully described with further reference to FIGS. 1–6 below. Referring now to FIG. 1, a wireless communication system 100 including at least one mobile device 102, 130 in wireless communication with a wireless network or infrastructure 110 or each other via at least one wireless channel 114, 134. The mobile devices 102, 130, illustrated in greater detail below with reference to FIGS. 3 and 4, may include any wireless communication devices at least capable of receiving multimedia information streams such as cellular phones, two-way radios, wirelessly-enabled personal digital assistants or computers, etc. Although the present invention is primarily applicable to mobile devices, in may be beneficially applied to any type of communication device, including non-mobile devices such as traditional, landline telephones, computers and the like. The wireless infrastructure 110 includes those elements necessary to support such wireless communications, as known in the art, the particulars of which elements will vary according to the type of system 100 employed. Such elements typically include base stations, resource controllers, transcoders, switches, and a variety of other elements known to those having ordinary skill in the art. The wireless channels 114, 134 are likewise dependent upon the nature of the system 100 implemented. In general, however, the wireless channels 114, 134 may include any wireless resources such as radio frequency (RF) channels, infrared channels, etc. supporting any suitable modulation protocol (e.g., frequency modulation, amplitude modulation, etc.) and/or access protocol, such as frequency-division multiplexed (FDM), time-division multiplexed (TDM) or code-division multiplexed (CDM) protocols. Note that the wireless channel labeled with reference numeral 134 may be provided in support of mobile-to-mobile communications such that the mobile devices 102, 130 may communicate with each other without intervention of the wireless infrastructure 110.

FIG. 1 particularly illustrates the manner in which multimedia content may be provided to, for example, a first mobile device 102 from a plurality of content sources 112, 122, 132, 140. The content sources 112, 122, 132, 140 may comprise any device or combination of devices capable of supplying multimedia content. In turn, multimedia content, in the context of the present invention, includes any audio and video information that requires decoding in a synchronized fashion. The audio information preferably comprises any suitable digital representation of audio signals and, in a similar fashion, the video information comprises any suitable digital representation of video signals. For example, various audio and video decoder combinations in accordance with the present invention are: an Adaptive Multi-Rate (AMR) audio decoder and an MPEG4 (part 2—video) video decoder; an Advanced Audio Coding (AAC) audio decoder and an MPEG4 (part 2—video) video decoder; a G.723.1 audio decoder and an H.263 video decoder; and a Windows Media Audio (WMA) audio decoder and a Windows Media Video (WMV) decoder.

Regardless of the actual multimedia content provided, content may be provided to the first mobile device 102 from a variety of sources. For example, a first content source 112 may be coupled to the wireless infrastructure 110 such that content from the first content source 112 may provided to the first mobile device 102 via a wireless channel 114. Alternatively, the first mobile device 102 may be coupled to a communication network 120 via a direct connection 150 or via the wireless infrastructure 110. In this manner, a second content source 122 may coupled to the first mobile device 102. In practice, the communication network 120 may comprise a public network such as the Internet or World Wide Web, a private network such as a corporate intranet, or a combination of public and private network elements. Regardless, where the content source 112, 122 is coupled to the first mobile device 102 via an intervening network, the content source 112, 122 may be embodied by a computer-based server platform of the type well known in the art. In yet another embodiment, a third content source 132 may be coupled to the first mobile device 102 via another mobile unit 130 and wireless channel 134. Finally, a fourth content source 140 may be coupled directly to the first mobile device 102. Content sources 132, 140 coupled directly to mobile devices 102, 130 may comprise memory cards or similar storage devices having the desired audio and video content stored thereon.

Figure 2:
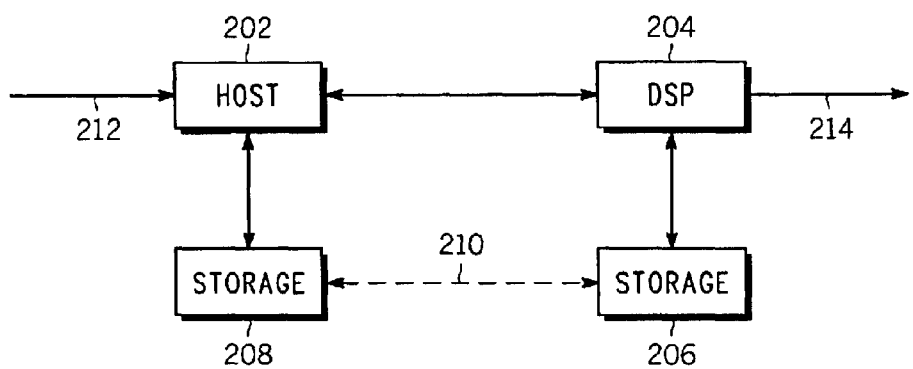
FIG. 2 is a block diagram of a wireless communication device in accordance with an embodiment of the present invention.

Referring now to FIG. 2, a more detailed view of a mobile device 102 is illustrated. In particular, the mobile device 102 includes a host 202 coupled to a digital signal processor (DSP) 204. The DSP 204 is coupled to a primary storage 206 and the host is coupled to a secondary storage 208. In general, the host 202 controls the overall operation of the mobile device 102. The host 202 may be any device or combination of devices capable of operating upon input data and signals and providing, as necessary, output data and signals. Various designs for such hosts are well known in the art. In a preferred embodiment, the host 202 includes a device capable of maintaining state information, such as a microprocessor, microcontroller, programmable logic, application-specific integrated circuit, etc. or combinations thereof. The DSP 204 performs specific, resource-intensive operations such as audio and video decoding and other operations associated with the handling of audio and video data. Although a digital signal processor is illustrated in FIG. 2, those having ordinary skill in the art will appreciate that other devices, such as co-processors, application-specific integrated circuits, programmable logic and the like, could be equally employed for such purposes. The primary and secondary storages 206, 208 preferably comprise may each include one or more storage devices, such as volatile (e.g., random access memory) or non-volatile (e.g., electrically-erasable programmable read-only memory) memory suitable for non-persistent or persistent storage of data or executable instructions. Furthermore, the primary and secondary storages 206, 208 may be implemented as discreet physical devices apart from the host 202 and DSP 204, respectively. Alternatively, either or both of the primary and second storages 206, 208, or portions thereof, may be integral to the host 202 or DSP 204, respectively.

The various techniques described below are preferably implemented as software code segments implemented as executable instructions, which code segments may be stored in the primary storage 206 or secondary storage 208 or in other storage devices not illustrated. As used herein, such code segments may include any grouping (i.e., contiguous or non-contiguous) of one or more executable instructions for carrying out specific operation. Such code segments may be stored in a single storage device or may be distributed among several storage devices as a matter of design choice. Although specific operations described below may be attributed to a single such code segment, those having ordinary skill in the art will appreciate that specific operations could be distributed in a variety of different ways among several code segments without loss in functionality.

In a presently preferred embodiment, the primary storage 206 is additionally coupled to the secondary storage 208 via an access mechanism 210. The access mechanism 210 may comprise a direct memory access (DMA) mechanism as know in the art. In a presently preferred embodiment, the access mechanism 210 is embodied as a so-called Inter-Processor Communications Module (IPCM) processor that executes simple programs or scripts. These scripts are loaded into the IPCM from the host 202 and instruct the IPCM to read data structures associated with the source and destination of the data transfer. On the source side, the data structures define where the IPCM should read data from the storage and how many elements or bytes are available. Likewise, on the destination side, the data structures define where to write the data and how many elements or bytes are requested. The script executes when each side of the transfer has set up and enabled its respective data structure. In this manner, as described below, the primary storage 206 can quickly swap out audio and video decoding contexts when it becomes necessary to rapidly switch between audio and video decoding operations.

In operation, a received information signal 212 is provided to the host 202, which received information signal 212 comprises encoded audio and video information. Using known techniques, the host 202 recognizes that the encoded audio and video information needs to be processed by the DSP 204 and either passes the encoded audio and video information to the DSP 204 or causes such information to be routed to the DSP 204 directly (illustrated by the dashed line). Note that either the host 202 or DSP 204, as a matter of design choice, may extract the respective streams of encoded audio and video information (i.e., de-multiplex them). In a presently preferred embodiment, the host 202 is used for this purpose. Using the techniques taught herein, the DSP 204 decodes the encoded audio and video information streams to provide decoded audio and video information 214. Thereafter, using elements not illustrated in FIG. 2, the decoded audio and video information 214 is presented to the user of the mobile device 102 in a synchronized fashion.

Figure 3:
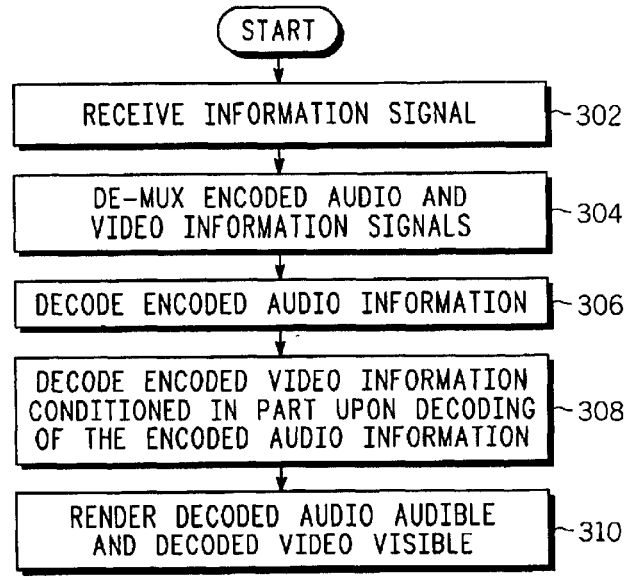
FIG. 3 is a flow chart illustrating a method in accordance with an embodiment of the present invention.

Referring now to FIG. 3, a generalized method in accordance with the present invention is illustrated. As described above, the method of FIG. 3 is preferably implemented with a mobile device using code segments designed to carry out the operations described herein. Thus, at block 302, an information signal is received by the mobile unit, which information signal may be received via, for example, a wireless channel, a local data port, a memory interface or any via any other input mechanism as known in the art. In a presently preferred embodiment, the received information signal includes multiplexed encoded audio and video information signals, although it is understood that the encoded audio and video information signals could be received separately and, in the logical extreme, could even be received from different sources, respectively. Assuming a multiplexed information signal, the encoded audio and video information signals are de-multiplexed at block 304. Such de-multiplexing techniques are well known in the art.

Thereafter, at block 306, the encoded audio information is decoded to provide decoded audio information. The particular technique used to decode the encoded audio information is dependent upon the particular technique used to encode the audio information. Typically, the audio encoding process takes a suitably digitized audio signal and compresses the digitized audio signal such that less bandwidth is required to transmit the encoded audio signal than would be required to transmit the digitized audio signal directly. Various audio encoding techniques of this type are well known in the art and the present invention is not limited in this regard.

Thereafter, at block 308, the encoded video information is decoded to provide decoded video information in a manner dependent upon (or slaved to) the decoding of the encoded audio information. In general, this implies that the encoded video information is not decoded until some portion of the encoded audio information is first decoded. It is assumed that audio information is encoded according to a rigid timing schedule, often referred to as a frame rate. Thus, an audio encoder will produce a frame of encoded audio every, for example, 20 milliseconds or at a rate of 50 frames per second. Conversely, video encoding generally tends to operate at an average frame rate (e.g., approximately every 67 milliseconds on average) with instantaneous frame rates that typically vary between every 30 to 500 milliseconds over time. These differences in audio and video encoding rates are likewise manifested at the decode (or receiving) side. That is, the audio frames are received at very regular and predictable intervals, whereas the intervals between video frames tend to vary over time, albeit at a constant average frame rate. The present invention relies on the rigid timing inherently imposed on the encoded audio information to organize synchronization between the audio and video information. A particular method for synchronizing the audio and video information, based on time stamps included with the encoded information, is described in greater detail below. In this manner, the present invention eliminates the need to separately maintain a decode-side system timer or the like, thereby minimizing consumption of relatively scarce power resources in the mobile device.

Referring again to FIG. 3, the decoded audio information and the decoded video information are thereafter presented (i.e., rendered audible and visible, respectively) to the user. Because the audio and video decoding processes are synchronized to each other based on the timing inherent in the received audio information, the rendering processes may be performed with the confidence that the decoded audio and video information streams are correctly synchronized to one another.

Figure 4:
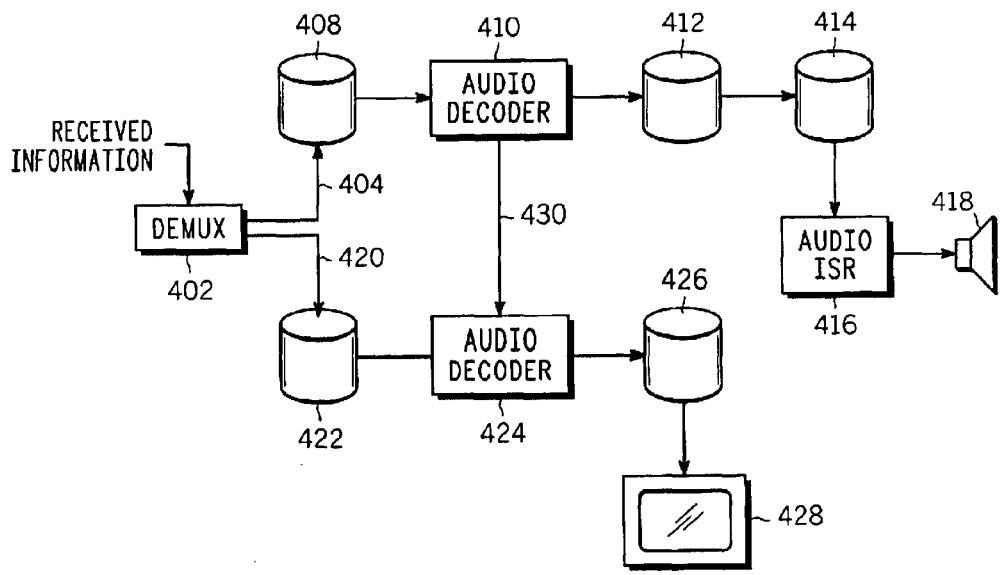
FIG. 4 is a block diagram illustrating decoding processes in accordance with an embodiment of the present invention.

A schematic illustration of a decoding process within a mobile device 102 in accordance with the present invention is further illustrated with reference to FIG. 4. As shown, a received information signal is input to a de-multiplexer 402 that, in turn, provides received encoded audio information 404 and received encoded video information 420 to respective input buffers 408, 422. Thereafter, an audio decoder 410 (preferably implemented using stored software code segments) operates upon the encoded audio information stored in its input buffer 408. In a preferred embodiment described in greater detail below with reference to FIG. 6, an audio decoding context is first established in primary storage used by the audio decoder 410 each time the audio decoder 410 operates. The resulting decoded audio information is thereafter provided to a series of buffers 412, 414. The series of buffers 412, 414 ensures that the decoded audio information output by the audio decoder 410 will be stored in such a manner that previously output decoded audio information will not be overwritten. An audio interrupt service routine 416 is invoked periodically (i.e., at the audio sampling rate) to cause individual samples of the decoded audio information to be rendered audible via a suitable speaker system 418 (e.g., at least one speaker).

Operating in parallel with the audio decoder 410, a video decoder 424 (also preferably implemented using stored software code segments) operates in a slaved fashion relative to the audio decoder 410. This is facilitated through the use of an indicator 430 received by the video decoder 424 from the audio decoder 410. In a presently preferred embodiment described below, the indicator 430 comprises an audio time stamp. The video decoder 424 uses the indicator 430 to determine whether to begin decoding the encoded video information stored in its corresponding input buffer 422 such that the resulting decoded video information will be synchronized to the decoded audio information. The decoded video information provided in this manner is stored to a frame buffer 426, as known in the art. The decoded video information stored in the frame buffer 426 is thereafter rendered on a suitable display device 428 in accordance with well known techniques.

Although the audio decoder 410 and video decoder 424 are preferably implemented using stored software segments executed by a DSP, as described above, it is understood that either or both of the audio decoder 410 and video decoder 424 may be implemented using dedicated circuitry. For example, the video decoder 424 could be implemented using a suitably programmed video co-processor or the like.

Figure 5:
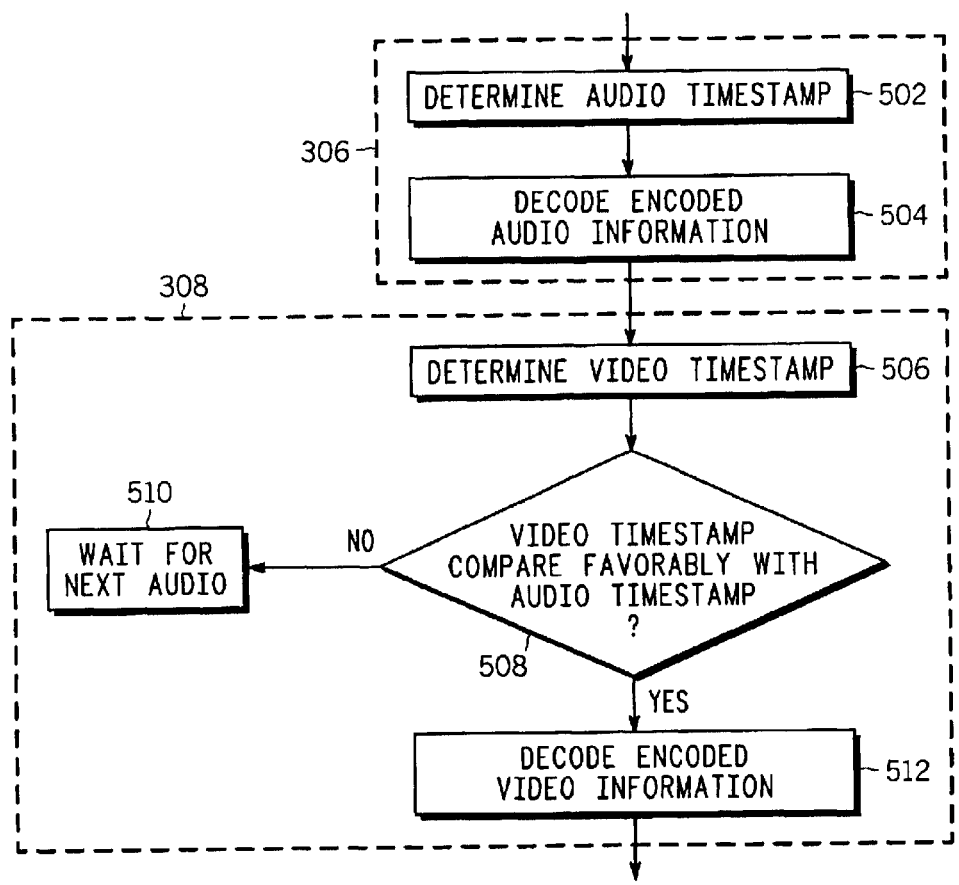
FIG. 5 is a flow chart illustrating a method in accordance with a preferred embodiment of the present invention.

Referring now to FIG. 5, a method in accordance with a preferred embodiment of the present invention based on the use of time stamps is illustrated. Specifically, greater details of the operations of blocks 306 and 308 are provided. In the embodiment of FIG. 5, it is assumed that both the encoded audio information and the encoded video information comprise time stamps that are determined, at the time of encoding, relative to a common time base or reference, as is commonly done using current techniques. Thus, each frame of encoded audio information will comprise an indication of when it was encoded relative to the common time base. Likewise, each frame of encoded video information will also comprise an indication of when it was encoded relative to the common time base. Typically, the common time base is represented as a monotonically increasing counter or similar mechanism, although those having ordinary skill in the art will recognize that other mechanisms could be used.

Regardless, at block 502, an audio time stamp associated with a given frame of encoded audio information is determined, which frame of encoded audio information is pending processing by the audio decoder. Referring to FIG. 4, the audio time stamp is used as the indicator 430 provided to the video decoder 424. In this manner, the audio time stamps provide the video decoder with a sequential indication of the progress of the audio decoding process. Thereafter, at block 504, the encoded audio information is decoded as described above.

Within the video decoding process 308, a video time stamp is determined for a given frame of encoded video information, which frame of encoded video information is pending processing by the video decoder. At block 508, the video time stamp is compared with audio time stamp. If the video time stamp does not compare favorably with the audio time stamp, the pending frame of encoded video information is not decoded. As such, the video decoder must wait for the next audio time stamp before it can proceed with decoding of the pending encoded video information. As used herein, a video time stamp compares favorably with an audio time stamp when the comparison indicates that the video decoding process is not temporally ahead of the audio decoding process. For example, assuming the time stamps are based on a monotonically increasing time reference, a favorable comparison results when the video time stamp is not greater (i.e., is less than or equal to) the audio time stamp. If the comparison at block 508 is favorable, the video decoder proceeds with decoding of the currently pending frame of encoded video data and updates the video frame buffer accordingly.

Using the present invention, the timing inherent in audio information is used to control synchronization of decoded audio and video information. In this manner, relatively scarce power resources may be conserved. However, power resources are typically not the only scarce resource in a mobile device. For example, data storage is often in limited supply due to cost and form factor considerations. More particularly, relatively high-speed storage (such as static random access memory) is typically available in limited quantities. Thus, it becomes necessary to operate within the storage constraints imposed by the mobile device.

Figure 6:
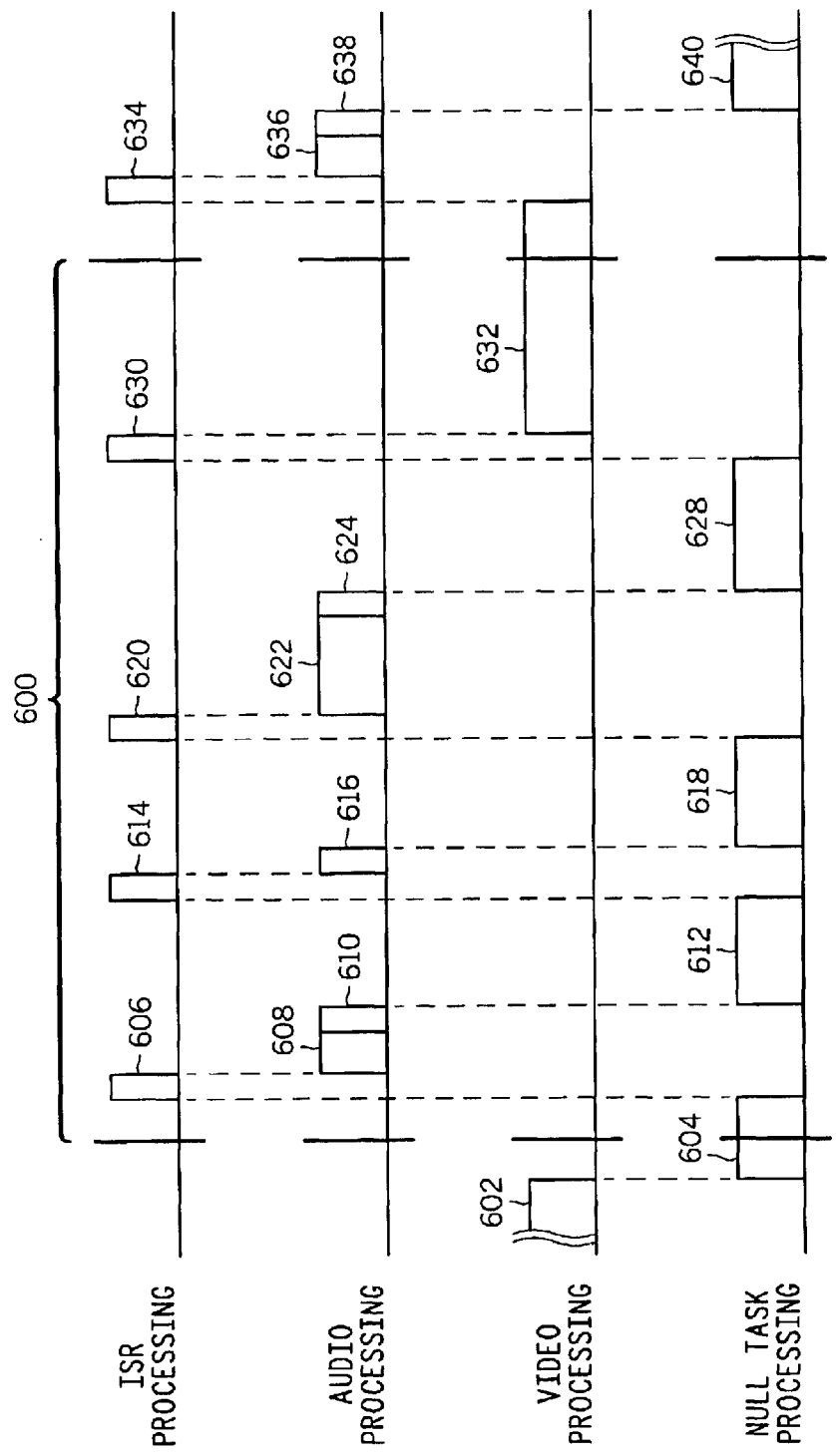
FIG. 6 is a timing diagram illustrating exemplary timing of audio and video decoding in accordance with an embodiment of the present invention.

A scheme for working with relatively scarce storage resources in accordance with the present invention is illustrated in FIG. 6. In particular, FIG. 6 illustrates exemplary timelines for various processes, with the progress of time illustrated from left to right. Additionally, the relative priorities of processes are illustrated with the highest priority process at the top and processes of decreasing priority toward the bottom of FIG. 6. Thus, interrupt service routine (ISR) processing is illustrated at the top of FIG. 6. A single complete audio frame interval 600 is illustrated, with portions of previous and subsequent intervals as well. During the previous interval, video decode processing 602 is assumed to complete decoding of a frame of encoded video information. During the video decode processing, a video decode context is maintained in primary storage used by the device implementing the video decode processing (e.g., the DSP 204 in FIG. 2). The video decode context comprises all information relating to the most recent operating state of the video decoder, including any variable data and the like, as well as any necessary executable instructions stored in the primary storage. Thereafter, assuming no other processing remains to be performed, so-called null task processing 604 is performed. In the example of FIG. 6, the null task processing occurs whenever there is no ISR, audio or video processing to be performed.

Shortly after the beginning of the current audio frame interval 600, audio ISR processing 606 is performed. During the audio ISR processing 606, a full frame of encoded audio information is transferred to the input buffer of the audio decoder. Thereafter, audio decode processing 608 is initiated, but is not allowed proceed until the video decode context is first saved from primary storage to secondary storage, and an audio decode context is restored from secondary storage to primary storage. Thus, the video decode context save is initiated 610 and the audio decode processing waits while for completion of the save. During this time (illustrated by null processing 612), the access mechanism 210 is used to save the video decode context to the secondary storage.

When the transfer is complete an interrupt 614 signaling completion of the transfer is processed by the ISR processing. At that point, the audio decode processing initiates 616 restoration of the audio decode context from the secondary storage to the primary storage. Like the video decode context, the audio decode context comprises all information relating to the most recent operating state of the audio decoder, including any variable data and the like, as well as any necessary executable instructions stored in the primary storage. In a presently preferred embodiment, the audio decode context does not include any variable data, only executable processing instructions. Again, the time required to transfer the audio decode context is represented by null processing 618. At the completion of the audio decode context to primary storage, another interrupt 620 is processed by the ISR processing, thereby signaling to the audio processing 622 to begin. In practice, the audio processing 622 may include any audio encode processing that needs to be performed by the mobile device (e.g., in the case where the user of the mobile device is transmitting audio information at the same time he/she is receiving the multimedia information). During the audio processing 622, the time stamp associated with the received encoded audio information is extracted and the decoding operations take place. The audio time stamp is thereafter made available to the video decoding process by storing the audio time stamp in a suitable memory location.

At the conclusion of the audio processing, which typically requires less time than video decoding, a request 624 to initiate another swap of the audio/video contexts is provided. In the embodiment illustrated in FIG. 6, it is assumed that the audio decode context does includes only a small amount of variable data state information that may be maintained in primary storage. As a result, the swapping procedure consists of merely overwriting most of the audio decode context in the primary storage with the video decode context from the secondary storage. For example, an AMR audio decoder is an example of a decoder that requires only a relatively small amount of variable data state information to be preserved. It is often the case, however, that audio decoders will have a sufficient quantity of such state information that swapping is required. In any event, this is illustrated as null processing 628. Upon completion of the restoration of the video decode context, a suitable interrupt 630 is processed indicating that video decode processing 632 can begin again. Assuming the previously extracted audio time stamp compares favorably with the video time stamp determined by the video decode processing 632, the video decode processing continues by decoding the encoded video information residing in its input buffer. Note that the video decode processing 632 continues unabated until additional audio ISR processing 634 needs to be performed. As before, the audio decode processing 636 is initiated and caused to wait until after completion of the audio/video decode context swap 638, 640 is once again completed. Although not illustrated in FIG. 6, the video decode processing 632 will remain pending until the video decode context has been restored after the audio decode processing has completed. In this manner, the continuous swapping of audio and video decode contexts allows audio and video decoding operation to be performed despite the relative scarcity of primary storage capacity. Additionally, by using the time stamp synchronization technique previously described, the decoding of audio and video information remain synchronized according to the timing boundaries inherent in the audio information.

The present invention provides a technique for synchronizing decoding operations of encoded audio and video information. This is accomplished by using the structured timing inherent in many audio encoding processes to eliminate the need for a dedicated decode-side system timing reference. Based on this timing, decoding of quasi-periodic video information is slaved to decoding of the periodic audio information. Using time stamps embedded in the encoded audio and video information, the audio decode process essentially instructs the video decode process when it is acceptable to execute. Furthermore, the present invention makes use of audio/video decode context swapping to provide efficient operation despite constraints in primary storage availablility.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. For example, situations may occur in which no audio information is present, i.e., a video-only session. In these instances, the audio decode process can synthesize "dummy" audio time stamps that are initialized based on the video time stamps, and processing may continue in the manner described above.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method in an electronics device, the method comprising:

providing decoded audio information by decoding encoded audio information;

providing decoded video information by decoding encoded video information; and slaving the decoding of the encoded video information to the decoding of the audio information such that decoding of the encoded video information occurs when a video time stamp is less than a reference audio time stamp.

2. The method of claim 1, further comprising:

receiving the encoded audio information at substantially periodic intervals;

synchronizing the decoding of the encoded audio information to each of the substantially periodic intervals; and synchronizing the decoding of the encoded video information to at least some of the substantially periodic intervals.

3. The method of claim 1, further comprising:

de-multiplexing the encoded audio information and the encoded video information from a received information signal.

4. The method of claim 3, further comprising:

receiving the received information signal via a wireless channel.

5. The method of claim 3, further comprising:

receiving the received information signal via a non-volatile storage device.

6. The method of claim 1, further comprising:

rendering the decoded audio information audible and the decoded video information visible at substantially the same time.

7. A method for synchronizing decoded audio information and decoded video information, the method comprising:

determining an audio time stamp associated with encoded audio information;

providing decoded audio information by decoding the encoded audio information;

determining a video time stamp associated with encoded video information; and providing decoded video information by decoding the encoded video information when the video time stamp compares favorably with the audio time stamp; and decoding the audio information by saving a video decoder context from primary storage to a secondary storage, decoding the encoded audio information based on the audio decoder context and resulting in an updated audio decoder context in the primary storage, saving the updated audio decoder context from the primary storage to the secondary storage, and restoring the video decoder context from the secondary storage to the primary storage.

8. The method of claim 7, further comprising:
de-multiplexing the encoded audio information and the encoded video information from a received information signal.

9. The method of claim 8, receiving the received information signal via a wireless channel.

10. The method of claim 8, receiving the received information signal via a non-volatile storage device.

11. A method for synchronizing decoded audio information and decoded video information, the method comprising:
determining an audio time stamp associated with encoded audio information;
providing decoded audio information by decoding the encoded audio information;
determining a video time stamp associated with encoded video information; and
providing decoded video information by decoding the encoded video information when the video time stamp compares favorably with the audio time stamp;
decoding the audio information by saving a video decoder context from a primary storage to a secondary storage, decoding the encoded audio information based on the audio decoder context and resulting in an updated audio decoder context in the primary storage, saving the updated audio decoder context from the primary storage to the secondary storage, and restoring the video decoder context from the secondary storage to the primary storage; and
the audio time stamp and the video time stamp comprise monotonically increasing time stamps, and decoding the encoded video information when the video time stamp is not greater than the audio time stamp.

12. The method of claim 11, further comprising:
rendering the decoded audio information audible and the decoded video information visible at substantially the same time.

13. A mobile electronics device handset, comprising:
a processor;
a storage device coupled to the processor;
processor executable instructions stored in the storage device,
the processor executable instructions including an encoded audio information decoding segment,
the processor executable instructions including an encoded video information decoding segment,
the processor executable instructions including an encoded an video information conditioning segment,
whereby execution of the encoded video information decoding segment is conditioned at least in part upon execution of the encoded audio information decoding segment such that decoding of the encoded video information occurs when a video time stamp is less than a reference audio time stamp.

14. The apparatus of claim 13, wherein the storage device further comprises executable instructions that, when executed by the at least one processor, cause the at least one processor to:

receive the encoded audio information at substantially periodic intervals; and
synchronize execution of the executable instructions for decoding th encoded audio information to each of the substantially periodic intervals and to synchronize execution of the executable instructions for decoding the encoded video information to at least some of the substantially periodic intervals.

15. The apparatus of claim 13, the processor executable instructions including a received signal encoded audio information de-multiplexing segment, the processor executable instruction including a received signal encoded video information de-multiplexing segment.

16. The apparatus of claim 13, at least one speaker coupled to the processor and a display coupled to the processor, the processor executable instructions including a decoded audio information rendering segment, the processor executable instructions including a decoded video information rendering segment, and the processor executable instructions including a video and audio information synchronization segment.

17. An apparatus comprising:
an audio decoder having an encoded audio information input, decoded audio information output, and an audio time stamp output, the audio time stamp being associated with the encoded audio information;
a video decoder having an encoded video information input, a decoded video information output, and a comparator component coupled to the audio time stamp output and the encoded video information input;
a primary data storage coupled to the audio decoder and the video decoder; and
a secondary data storage coupled to the primary storage,
wherein a video decoder context in the primary storage is saved to the secondary storage and an audio decoder context from the secondary storage is restored from the secondary storage to the primary storage in response to pending operation of the audio decoder,
and wherein, in response to decoding of the encoded audio information by the audio decoder based on the audio decoder context and resulting in an updated audio decoder context in the primary storage, the updated audio decoder context is saved from the primary storage to the secondary storage, and the video decoder context is restored from the second storage to the primary storage.

18. The apparatus of claim 17, further comprising:
at least one speaker coupled to the audio decoder; and
a display coupled to the video decoder.

19. The apparatus of claim 17, further comprising:
a de-multiplexer coupled to the audio decoder and the video decoder, the de-multiplexer having a received information signal input, the de-multiplexer having an encoded audio information output and an encoded video information output.

20. A wireless communication device comprising the apparatus of claim 17.

* * * * *